United States Patent [19]
Lowton

[11] Patent Number: 5,396,694
[45] Date of Patent: Mar. 14, 1995

[54] METHOD OF MANUFACTURING A GRAPHITE FOIL COATED RESERVOIR

[75] Inventor: Ronald P. Lowton, Burtonwood, United Kingdom

[73] Assignee: Silent Power GmbH Fur Energiespeichertechnik, Germany

[21] Appl. No.: 941,436

[22] PCT Filed: May 16, 1991

[86] PCT No.: PCT/GB91/00771
  § 371 Date: Oct. 28, 1992
  § 102(e) Date: Oct. 28, 1992

[87] PCT Pub. No.: WO91/18425
  PCT Pub. Date: Nov. 28, 1991

[30] Foreign Application Priority Data
  May 16, 1990 [GB] United Kingdom ............ 9010949

[51] Int. Cl.$^6$ .................. B23P 11/00; B28B 1/48
[52] U.S. Cl. .................... 29/527.1; 264/154; 264/316; 29/623.5; 29/428
[58] Field of Search ......... 264/313, 248, 250, 316, 264/154, 570; 429/104, 193; 29/623.1, 623.5, 623.2, 425, 463, 428, 527.1

[56] References Cited

U.S. PATENT DOCUMENTS

| | | | |
|---|---|---|---|
| 3,265,798 | 8/1966 | Lyle, Jr. | 264/313 |
| 3,502,759 | 3/1970 | Olstowski et al. | 264/120 |
| 4,000,235 | 12/1976 | Van Leemput | 264/109 |
| 4,220,691 | 9/1980 | Roth et al. | 429/104 |
| 4,265,952 | 5/1981 | Caines | 428/36 |
| 4,395,810 | 8/1983 | Tsuzawa et al. | 29/463 |

FOREIGN PATENT DOCUMENTS

| | | |
|---|---|---|
| 0032032A2 | 7/1981 | European Pat. Off. |
| 2945013A1 | 5/1981 | Germany. |
| 841643 | 7/1960 | United Kingdom. |
| 1116643 | 6/1968 | United Kingdom. |
| 1288077 | 9/1972 | United Kingdom. |
| 1351444 | 5/1974 | United Kingdom. |
| 1483286 | 8/1977 | United Kingdom. |
| 1587905 | 4/1981 | United Kingdom. |
| 2068632B | 8/1981 | United Kingdom. |
| WO89/05527 | 6/1989 | WIPO. |

Primary Examiner—Christopher A. Fiorilla
Attorney, Agent, or Firm—Finnegan, Henderson, Farabow, Garrett & Dunner

[57] ABSTRACT

A method of manufacturing a graphite foil coating wherein the coating is prepared prior to location on the components to be coated by isostatic pressing of graphite foil in a molding apparatus. The graphite foil coating may be for use in an alkali metal energy conversion device.

10 Claims, 3 Drawing Sheets

METHOD OF MANUFACTURING A GRAPHITE FOIL COATED RESERVOIR

The present invention relates to a method of manufacturing a graphite foil coating for use in an alkali metal energy conversion device, in particular, a method for manufacturing a graphite foil coating for the reservoir which holds the molten alkali metal in a sodium sulphur cell.

In a sodium sulphur cell, for example, a solid electrolyte material, typically beta alumina, separates molten sodium, constituting the anode, from the cathodic reactant comprising molten sulphur and sodium polysulphides. In a device such as that described in WO 89/05527 the molten sodium is held in a reservoir of very thin mild steel. The outer surface of the mild steel is then coated with graphite foil to provide protection against corrosive attack by any sodium polysulphides appearing in the space between the reservoir and the solid electrolyte in the event of failure of the electrolyte. However, since the reservoir is made from a very thin mild steel the problem is one of how to apply a graphite foil (or graphoil) coating without damaging the reservoir. In order to prevent the reservoir from crushing under the external pressure it has been known to pressurize the interior of the reservoir at the same time as the coating is pressed onto the reservoir but this method is by no means satisfactory.

Accordingly, the present invention provides a method of manufacturing a graphite foil coating for use in an alkali metal energy conversion device wherein the coating is prepared prior to location on the component to be coated by isostatic pressing of graphite foil in a molding apparatus.

Preferably, the coating is made by molding separate pieces which when located over the component to be coated provide a continuous coating.

Preferably, the coating pieces are made by placing a sufficient quantity of graphite foil within a bowl to line the interior of the bowl and then applying the isostatic pressure to bond the graphite foil to itself to form a coating piece of conformal shape to the surface it is to coat.

Preferably, the coating pieces are made by placing a sufficient quantity of graphite foil over a mandrel and then applying isostatic pressure to bond the graphite foil to itself to form a coating piece of conformal shape to the surface it is to coat.

Preferably, the isostatic pressure is applied by locating a pressing bag of polyurethane over the graphite foil and placing the arrangement within an isostatic press.

Preferably, the graphite foil coating is then applied to the outer surface of the reservoir which holds the molten sodium metal in a sodium sulphur cell.

Preferably, the graphite foil coating is made by isostatic pressing of graphite foil to form upper and lower graphite foil cups for location on the upper and lower portions of the reservoir.

Preferably, one of the graphite foil cups is provided with a rim for engagement with the other graphite foil cup.

Preferably, the upper and lower graphite foil cups are provided with a hole substantially in the center of the base portion of the cup.

Preferably, a hole is pre-cut in a disc of graphite foil and there is a nipple over which the disc is placed either in the base of the bowl or on the tip of the mandrel.

Preferably, a hole is made by providing a hole either in the base of the bowl or on the tip of the mandrel such that when the graphite foil is isostatically pressed a hole will be formed in the graphite foil.

A preferred embodiment of the present invention will now be described in detail, by way of example only, with reference to the accompanying drawings, of which:

Figure 1:
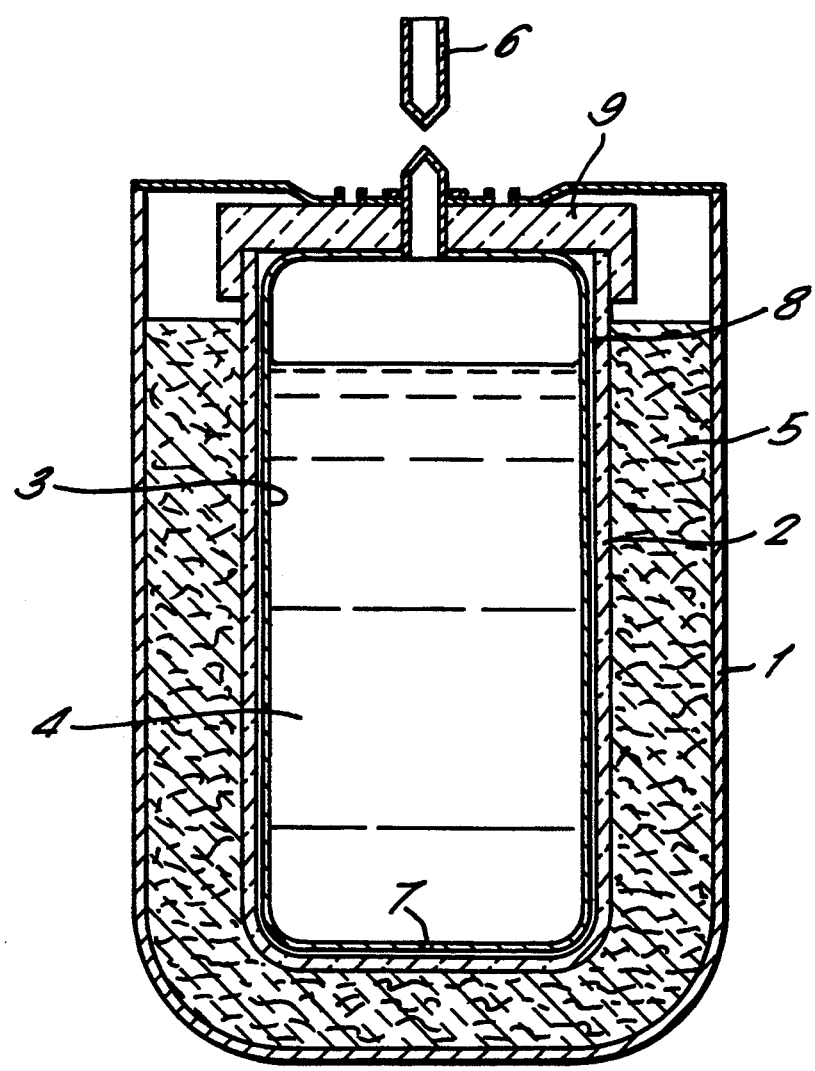
FIG. 1 is a view in cross-section of a typical sodium sulphur cell which could incorporate a graphite foil coating in accordance with the present invention.

FIG. 1 shows a typical sodium sulphur cell having a generally cylindrical shape. The cell has an outer container 1 of metal, typically mild steel which is internally coated to make it resistant to the cathodic reactant 5 of the cell. The cell incorporates an inner tube 2 of beta alumina which forms the electrolyte cup. The electrolyte cup 2 is closed at its upper end by a cap 9 of insulating material, typically alpha alumina. Inside the electrolyte cup 2 is a reservoir 3 of very thin mild steel which holds molten sodium 4 constituting the anode. The cathodic reactant 5 is located between the electrolyte cup 2 and the outer metal container 1. There is a filling tube 6 for filling the reservoir 3 with molten sodium 4. The reservoir 3 has a small aperture 7 at its base to fill by capillary action the narrow space between the reservoir 3 and the electrolyte cup 2. If the reservoir 3 is to be coated with graphite foil it is the outer surface 8 which must receive protection against corrosion by any sodium polysulphides which could leak into the space between the reservoir 3 and electrolyte cup 2 if the cup 2 was fractured, for example.

As explained earlier, the problem to be solved was one of how to apply a graphite foil coating to the reservoir 3 without damaging the reservoir in the process. This problem has been solved by the present invention in that graphite foil cups are molded to shape prior to locating them on the outer surface 8 of reservoir 3. FIGS. 2 to 5 are cross-sectional views of the apparatus used to make graphite foil cups suitable for coating, for example the outer surface 8 of reservoir 3 in FIG. 1. It should be noted that the drawings are not to scale.

Figure 2:
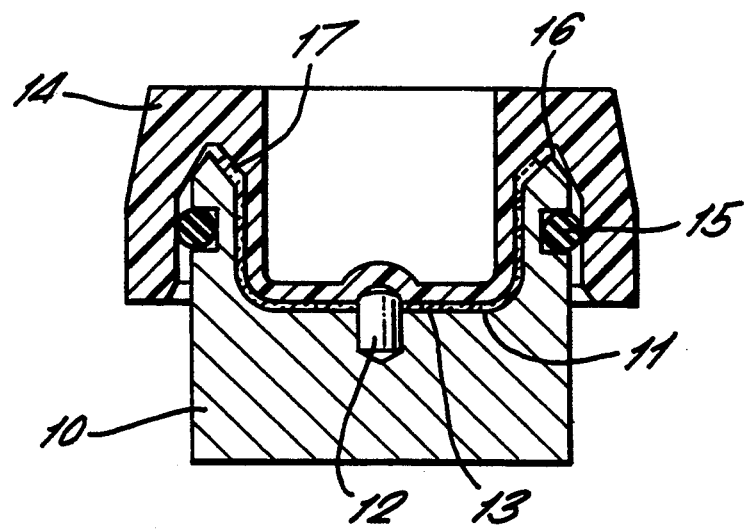
FIGS. 2 and 3 are cross-sectional views of the apparatus used to form the top and bottom graphite foil coating cups for the reservoir of a sodium sulphur cell similar to that in FIG. 1.

FIG. 2 shows a pressing bowl 10 of stainless steel which has a polished interior surface 11 to prevent sticking of the graphite foil 13. The interior surface 11 is contoured to be of conformal shape to the outer surface 8 of the reservoir to be coated. In this case, the pressing bowl 10 is contoured such that the graphite foil cup 13 formed would fit over the upper half of a reservoir 3 such as that depicted in FIG. 1. The nipple 12 in the pressing bowl 10 creates a hole in the graphite foil cup 13 which aligns with the inlet to the reservoir 3 in FIG. 1.

The graphite foil cup 13 is made by placing a preformed disc of graphite foil which has a pre-cut hole into the base of the pressing bowl 10 such that the hole is placed over nipple 12 and a cylindrical strip of graphite foil against the walls of the pressing bowl 10. The strip is rolled into a cylinder before locating it in the pressing bowl 10 such that it will then spring outward against the walls of the pressing bowl 10.

A plug 14 of an elastomeric polyurethane material is then fitted into the bowl 10. The plug 14 is commonly referred to in the art as an isostatic pressing bag. The stainless steel pressing bowl 10 has an O-ring seal 15 located on its outer surface to form a seal with the part of the plug 14 which contacts the outer surface of the pressing bowl 10.

When the plug or pressing bag 14 is in place the arrangement is then placed in an isostatic press which is a chamber containing water and soluble oil which is typically capable of being pressurized up to 40,000 psi (430 Megapascals (Mpa)). The pressure of the water and soluble oil presses the polyurethane pressing bag 14 evenly over the entire interior of the pressing bowl 10 to apply the 40,000 psi pressure to the graphite foil 13. The pressure is sufficient to bond the graphite foil 13 to itself but because the interior 11 of the pressing bowl 10 is polished the graphite foil 13 will not bond to the bowl.

The structure is then removed from the isostatic press and the graphite foil 13, now in the form of a cup with a hole in its base, can be removed from the pressing bowl 10.

An alternative method of forming the hole in the base of the cup is to provide a hole in the base of the pressing bowl 10 in place of the nipple 12. Under isostatic pressure the graphite foil will be forced into the hole and a hole will then be created in the molded cup. However, the hole created in this way will have rough edges and for this reason it is generally preferred to pre-cut the hole and use a nipple formation in the base of the pressing bowl.

The pressing bowl 10 can be provided with sloped shoulders 16 such that the graphite foil cup 13 is pressed to form a flared rim 17 which will aid interengagement with the lower graphite foil cup 20 depicted in FIG. 3 and discussed below. Alternatively, the lower graphite foil cup 20 could be formed with a flared rim and the upper graphite foil cup 13 with straight sides.

Figure 3:
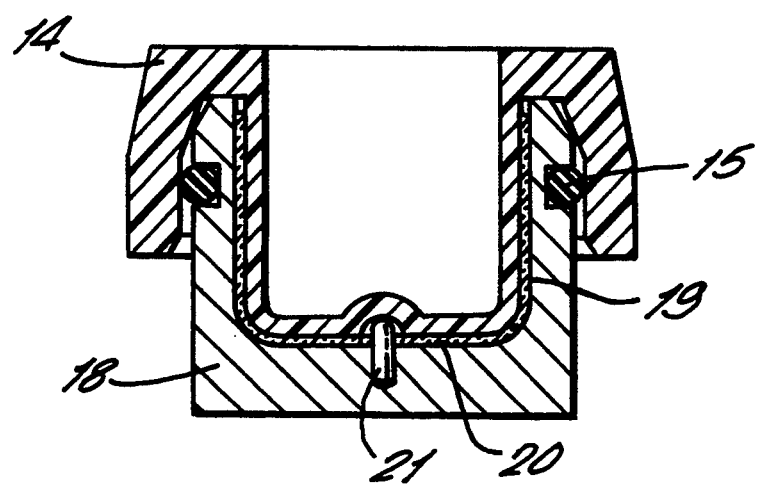

FIG. 3 shows a pressing bowl 18 similar to that in FIG. 2 which is used to form a graphite foil cup 20 which will fit over the lower half of the reservoir 3 depicted in FIG. 1 In this drawing, there are features which correspond to those in FIG. 2. The pressing bowl 18 has an interior surface 19 which is contoured to be of conformal shape to the lower outer surface 8 of the reservoir 3 to be coated. The nipple 21 in the pressing bowl 18 creates a hole in the graphite foil cup 20 which aligns with the small aperture 7 in the base of the reservoir 3.

The graphite foil cup 20 is formed in the same manner as the graphite foil cup 13 using an isostatic pressing bag 14 sealed in place by an O-ring 15 on the outer surface of the pressing bowl 18.

When both cups 13 and 20 have been formed they can then be placed carefully over the reservoir 3 before it is located within the electrolyte cup 2. A rim 17 on the upper cup 13 will provide a more secure fit of the cups when they are in place on the reservoir 3.

Figure 4:
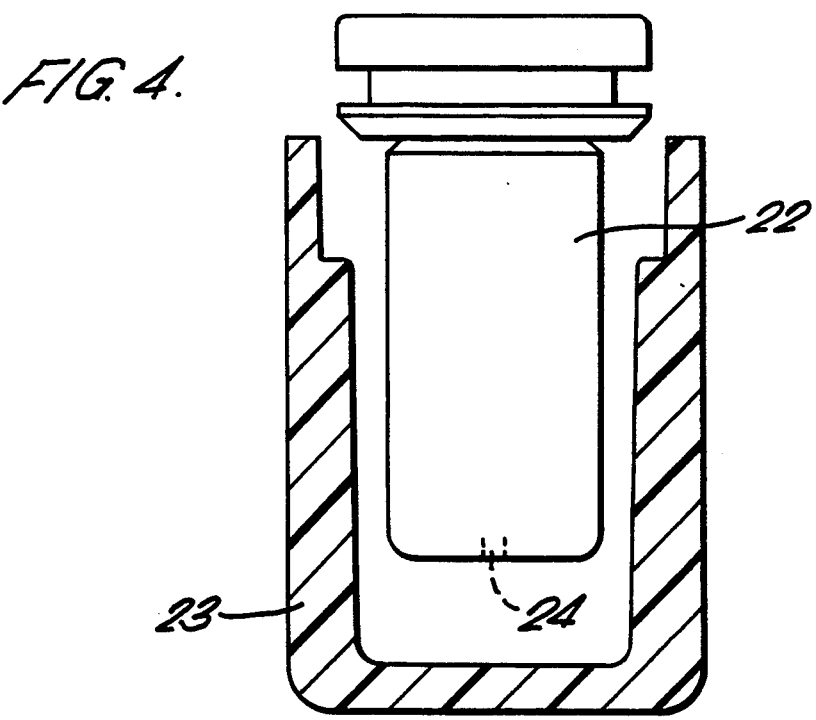
FIG. 4 is a cross-sectional view of a mandrel and corresponding isostatic pressing bag used to form a coating for the reservoir of a sodium sulphur cell similar to that in FIG. 1.
Figure 5:
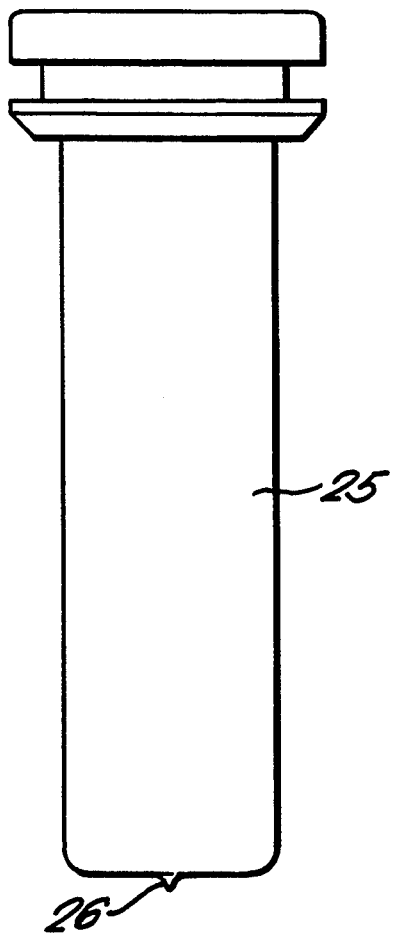
FIG. 5 is a variation on the mandrel depicted in FIG. 4.

FIGS. 4 and 5 show alternative apparatus used to make graphite foil castings as discussed in connection with FIGS. 2 and 3.

FIG. 4 is a cross-sectional view of a mandrel 22 and an isostatic pressing bag 23. The mandrel has a hole 24 at its tip which will create a hole in the base of the graphite foil cup during isostatic pressing of graphite foil.

FIG. 5 is a variation on the mandrel depicted in FIG. 4. The essential difference is that the mandrel 25 has a nipple 26 rather than a hole at its tip. As explained in connection with FIGS. 2 and 3 this will create a hole in the base of the graphite foil cup which has clean cut edges.

The graphite foil cups are made by placing a disc of graphite foil over the tip of the mandrel and a strip of foil around the body of the mandrel. If the mandrel has a nipple 26 as in FIG. 5 the disc will have a pre-cut hole, whereas if the mandrel has a hole 24 as in FIG. 4 the disc will be complete. The isostatic pressing bag will then be positioned over the mandrel and pressurised in the manner described in connection with FIGS. 2 and 3.

The advantage of using a mandrel over a pressing bowl is that the graphite foil coatings are much easier to remove from the molding apparatus once they have been isostatically pressed.

Apparatus of varying dimensions have been depicted to suit the varying dimensions of sodium sulphur cells such as that depicted in FIG. 1. Clearly the apparatus can be adapted to suit varying dimensions and modifications to the cells.

Although FIGS 1 to 5 depict an arrangement for applying a graphite foil coating to the reservoir for holding the alkali metal in a sodium sulphur cell device, a similar method and arrangement could be employed for coating other components in energy conversion devices.

I claim:

1. A method of manufacturing a graphite foil coated reservoir for holding molten alkali metal in an alkali metal energy conversion device comprising the steps of:
    providing a reservoir having an outer surface to be coated;
    manufacturing a graphite foil coating by isostatically pressing separate coating pieces of graphite foil in a molding apparatus, said graphite foil coating comprising upper and lower graphite foil cups each provided with a hole substantially in the center thereof; and
    locating the upper and lower graphite foil cups on upper and lower portions of the reservoir to provide a continuous coating thereon.

2. A method as claimed in claim 1 wherein one of the graphite foil cups is provided with a rim for engagement with the other graphite foil cup.

3. A method as claimed in claim 1 wherein each of the upper and lower graphite foil cups includes a base portion formed by a disc of graphite foil which is pre-cut to form a hole, and wherein the molding apparatus includes a nipple over which the disc is placed.

4. A method as claimed in claim 1 wherein a hole is made in each of the upper and lower graphite foil cups by providing a hole in the molding apparatus such that when the graphite foil is isostatically pressed a hole will be formed in the graphite foil.

5. A method as claimed in claim 1 or claim 2 wherein the graphite foil cups are made by placing a sufficient quantity of graphite foil within a bowl having an interior which conforms to at least a part of said outer surface of the reservoir to line the interior of the bowl and then applying isostatic pressure to the graphite foil to bond the graphite foil to itself to form a coating piece of conformal shape to said at least a part of said outer surface of the reservoir.

6. A method as claimed in claim 5 wherein the sufficient quantity of graphite foil includes a disc of graphite foil having a pre-cut hole therein, and wherein the bowl includes a nipple over which the disc is placed.

7. A method as claimed in claim 5 wherein a hole is made in the graphite foil by providing a hole in the bowl such that when the graphite foil is isostatically pressed a hole will be formed in the graphite foil.

8. A method as claimed in claim 1 or claim 2 wherein the graphite foil cups are made by placing a sufficient quantity of graphite foil over a mandrel having an exterior which conforms to at least a part of said outer surface of the reservoir and then applying isostatic pressure to the graphite foil to bond the graphite foil to itself to form a coating piece of conformal shape to said at least a part of said outer surface of the reservoir.

9. A method as claimed in claim 8 wherein the sufficient quantity of graphite foil includes a graphite foil disc having a pre-cut hole therein, and wherein the mandrel includes a nipple over which the disc is placed.

10. A method as claimed in claim 8 wherein a hole is made in the graphite foil by providing a hole on the mandrel such that when the graphite foil is isostatically pressed a hole will be formed in the graphite foil.

* * * * *